Patented Apr. 13, 1926.

1,580,233

UNITED STATES PATENT OFFICE.

HOWARD NORMAN COPTHORNE, OF WINNETKA, ILLINOIS, ASSIGNOR TO ILLINOIS GRAPHITE COMPANY, OF CHICAGO, ILLINOIS, A CORPORATION OF ILLINOIS.

PENETRATING OIL AND LUBRICANT.

No Drawing.  Application filed June 5, 1924. Serial No. 718,061.

*To all whom it may concern:*

Be it known that I, HOWARD NORMAN COPTHORNE, a citizen of the United States of America, and a resident of Winnetka, county of Cook, and State of Illinois, have invented a new and useful Improvement in Penetrating Oils and Lubricants, of which the following is a specification.

The main object of this invention is to provide an oil of high penetrating power to act as a lubricant and vehicle to carry cushion lubricating matter between coacting surfaces having very slight relative motion, and where said coacting surfaces have a spacing varying from .001th of an inch to zero; to provide a light oil of low evaporating rate which will hold deflocculated graphite in suspension indefinitely and even permit the graphite to pass through filter paper without precipitation, and further to act as a vehicle to carry by capillary attraction the graphite between the leaves of automobile springs. When deflocculated graphite is suspended in hydro carbon oils of low viscosity. the lubricating value is greater and more lasting in its effects than when the same form of graphite is mixed with the ordinary viscous lubricating oils.

Practical road tests on the chassis of an automobile and particularly on the body-supporting springs, together with laboratory tests with filter paper, show that the light naphtha oils in common use as a vehicle for graphite only penetrate a comparatively short distance before the oil leaves a deposit or graphite cushion, which acts as a dam, preventing further penetrating action. Uncoupling of springs which have been treated with the usual lubricating oils shows that the oil has penetrated on an average about ⅜ of an inch on each edge of the spring, leaving the center of approximately 1½ inches without any lubricant. My discovery comprises the use as a vehicle of a penetrating oil having a very low evaporating rate, which oil carries with it the deflocculated graphite into the smaller spaces. The vehicle of itself has a substantial lubricating value. This vehicle is obtained by the re-distillation of pentadecane, $C_{15}+H_{32}$, or oil of the paraffin group known as heavy lubricating oils. In the process of re-distillation there is separated or cracked from such lubricating oil a distillate having a specific gravity of approximately .843 at 60° F. at a distilling range from 220° C. to 350° C. This distillate has the physical appearance and some of the characteristics of pentane $C_5+H_{12}$, but evaporates slowly. This distillate when mixed with powdered or deflocculated graphite has to a remarkable degree the ability to hold the graphite in a finely divided state for an indefinite period. The oil appears to have almost no viscosity, hence its great penetrating power. When this distillate is subjected to re-distillation both the re-distillate and the residue are failures in performing the function of a penetrating oil acting as a carrier for graphite. The new distillate obtained by distilling the penetrating oil is a failure because it evaporates like the light naphtha oils, and the residue because it has the non-penetrating characteristics of the viscous oils. When prepared as a commercial product it is more pleasant to handle when there is incorporated in the mixture amyl acetate, oil of citronella, or essential oils as an odorizer.

I claim:

A lubricant comprising deflocculated graphite suspended in a distillate having a specific gravity of approximately .843 at 60 degrees F. obtained by cracking pentadecane at a distilling range of 220 degrees C. to 350 degrees C.

Signed at Chicago this 4th day of April, 1924.

HOWARD NORMAN COPTHORNE.